B. G. MARTIN.
CLUTCHES FOR PULLEYS.
No. 179,804. Patented July 11, 1876.
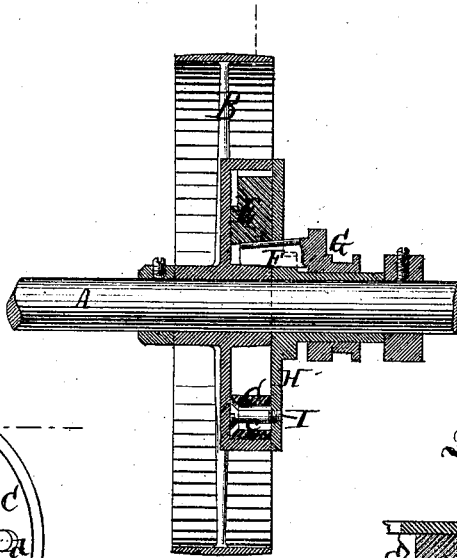
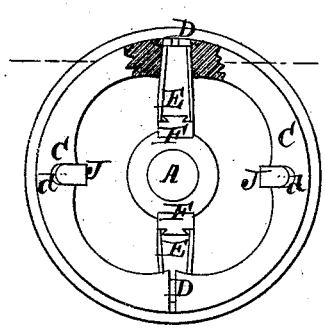
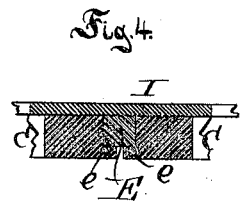
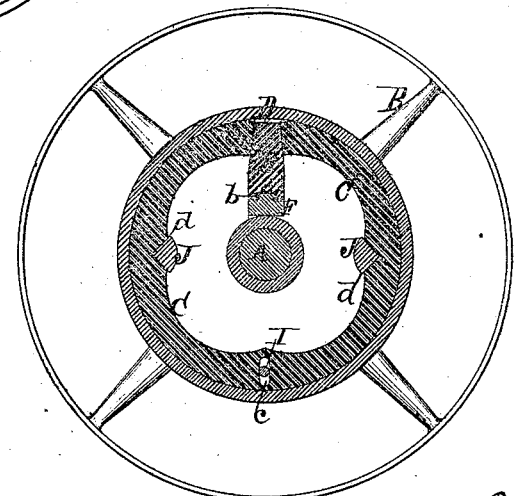
Witnesses.
Inventor.
Benj. G. Martin
by
Van Santvoord & Hauff
his Attorneys

UNITED STATES PATENT OFFICE.

BENJAMIN G. MARTIN, OF NEW YORK, N. Y., ASSIGNOR TO HIMSELF AND HENRY CURTISS, OF SAME PLACE.

IMPROVEMENT IN CLUTCHES FOR PULLEYS.

Specification forming part of Letters Patent No. 179,804, dated July 11, 1876; application filed June 29, 1876.

*To all whom it may concern:*

Be it known that I, BENJAMIN G. MARTIN, of the city of New York, N. Y., have invented a new and useful Improvement in Clutches for Pulleys, which improvement is fully set forth in the following specification, reference being had to the accompanying drawing, in which—

Figure 1 is an axial section of my improved clutch. Fig. 2 is a cross-section in the line $x$ $x$ of Fig. 1.

Similar letters indicate corresponding parts.

This invention relates to clutches for pulleys; and consists of a wedge arranged to move radially between the ends of an expansible friction-ring, which is secured within the pulley, the wedge being so connected with a slide, which is moved in line with the shaft, that the wedge is forced outward or inward in radial lines with a positive movement by the movements of the slide. The slide is fastened to a shifting collar, which is free to move endwise on the shaft, but is prevented from turning thereon. The friction-ring is held in place by a pin, which passes through an elongated slot near its edge, and is fastened in a disk, which forms one side of the pulley. The said slot allows the ring to have a slight motion on the pin, as will be hereinafter explained. The ring is cut apart at a point opposite to its slot, so as to allow the wedge to pass in between its ends, when the ring is to be expanded to bring its periphery against the inner periphery of the pulley. The friction-ring is centered on the disk by means of angular pins, which project from the disk, and fit in angular recesses made in the inside of the ring, so that when the ring is released from the strain of the wedge, and its tension causes its sides to be contracted, its sides will contract against the angular pins, which thus prevent either side of the ring from swinging against the pulley.

My invention also embraces the construction of the friction-ring in two or more parts, in which case there will be a wedge between the ends of each division, each wedge being operated by a slide from the shifting collar.

Referring to Figs. 1 and 2 of the drawing, the letter A designates a shaft, upon which is arranged a loose pulley, B, the said pulley being made hollow, and containing an elastic ring, C, which is divided, as at D, so that it is capable of expansion and contraction. Between the ends of said ring C is placed a radial wedge, E, which rests against a slide, F, extending parallel to the shaft A, the wedge and the slide being connected together by means of a dovetailed groove, $a$, and a corresponding tenon, $b$, so that when the slide F is moved in one or the other direction, the wedge E is forced outward or inward, as the case may be, and the ring C is either expanded or permitted to contract by its inherent elasticity. When the ring C is expanded, its periphery is brought into frictional contact with the inner surface of the pulley B.

The slide F is affixed to a shifting collar, G, which is feathered on the shaft A, so that it turns with the shaft, and at the same time is capable of sliding endwise thereon. The collar G is moved by means of a suitable shipping-lever. (Not shown.) By means of the collar G the slide F can readily be moved back and forth, so as to actuate the wedge E.

The ring C is secured to a disk, H, forming one side of the pulley B, and which is fastened to the shaft A. For the purpose of securing the ring C to the disk H, I make use of a pin, I, which projects from the inner surface of the disk H, and passes through a radial slot, $c$, formed in and near the edge of the ring C. By this arrangement the disk H and the ring C are caused to partake of the motion of the shaft A; and when a revolving motion is imparted to the shaft, and the wedge E is forced outward by the slide F, so as to expand the ring C, the motion of the shaft is transmitted to the pulley B.

The object of the radial slot $c$ is to permit the friction-ring C to move on the pin I, when the said ring is expanded or allowed to contract, and especially to allow the ring to clear the inner surface of the pulley B.

In the inner edge of the ring C are formed notches $d$, to receive pins J, projecting from the inner surface of the disk H, and by which the ring is held in a concentric position when released from the action of the wedge E. In other words, by the pins the ring C is prevented from sagging or falling against the pulley B when it is relaxed.

In the example shown in Figs. 3 and 4, the ring C is made in two parts, while a wedge, E is arranged between the ends of each division of the ring, each of the wedges being operated by a slide, F, affixed to the shifting collar G. When the ring C is made as last stated, I provide both the parts of the said ring and the wedges E with lips $e$, as seen in Fig. 4, and so arrange the parts that these lips overlap each other, by which arrangement the ring is not only expanded, but also contracted or drawn together by the action of the wedges E, and the ring need not be made elastic, as in the example shown in Figs. 1 and 2.

What I claim as new, and desire to secure by Letters Patent, is—

1. The combination, in a clutch for pulleys, of the disk H, expansible friction-ring C, and wedge E, arranged between the ends of the said ring, the slide F, and collar G, the whole being constructed and adapted to operate substantially as described.

2. The combination of a pin, I, and radial slot $c$ with the expansible friction-ring C and disk H, substantially as and for the purpose described.

3. The combination of angular pins J and corresponding notches $d$ with the expansible friction-ring C and disk H, substantially as and for the purpose described.

4. The combination of the disk H and an expansible friction-ring, C, made in two or more parts, two or more wedges, E, a slide, F, connected by a dovetail, and collar G, the whole constructed and adapted to operate substantially as described.

In testimony that I claim the foregoing I have hereunto set my hand and seal this 28th day of June, 1876.

B. G. MARTIN. [L. S.]

Witnesses:
 E. F. KASTENHUBER,
 CHAS. WAHLERS.